(12) United States Patent
Sibley (10) Patent No.: US 6,820,843 B2
(45) Date of Patent: Nov. 23, 2004

(54) COLLECTION RACK SYSTEM (76) Inventor: Robert Sibley, 8816 Charbane, White Lake, MI (US) 48386

( * ) Notice: Subject to any disclaimer, the term of this patent is extended or adjusted under 35 U.S.C. 154(b) by 0 days.

(21) Appl. No.: 10/403,709

(22) Filed: Mar. 31, 2003

(65) Prior Publication Data

US 2004/0188572 A1 Sep. 30, 2004

(51) Int. Cl.[7] .............................................. A63B 55/08
(52) U.S. Cl. ...................................................... 248/98
(58) Field of Search ............................ 248/97, 98, 99, 248/129, 907, 95, 175; 53/390

(56) References Cited

U.S. PATENT DOCUMENTS

| 3,313,504 | A | * | 4/1967 | Stoltze | 248/99 |
| 3,762,738 | A | * | 10/1973 | Christina | 280/47.19 |
| 5,899,429 | A | * | 5/1999 | McCloud | 248/441.1 |
| 6,402,098 | B2 | * | 6/2002 | Rosky | 248/99 |
| 6,666,465 | B2 | * | 12/2003 | Chan | 280/47.26 |

* cited by examiner

Primary Examiner—Ramon O Ramirez

(57) ABSTRACT

A collection rack comprising a base having a first side and a second side and an integrated waste container dispenser located thereon, a first upright arm extending out from the first side of the base, a second arm extending out from the second side of the base wherein a waste container is attached across the first and second upright arms.

4 Claims, 6 Drawing Sheets

COLLECTION RACK SYSTEM

TECHNICAL FIELD

This invention relates generally to a collection system and more particularly to a waste collection rack system for use in collecting waste materials or soiled materials.

BACKGROUND OF THE INVENTION

Prior art collection systems are of the standard variety known in the art such as large wheeled plastic or rubber receptacles. These receptacles are often bulky and unsightly and give a less than organized appearance. Further the plastic receptacles are susceptible to scratching and marring with extended use. This scratching or marring creates areas where dirt, dusts and germs may collect to reduce the cleanliness of the receptacle. This scratching and marring increases the replacement intervals for these receptacles and raises costs. U.S. Design Pat. No. 416,658 discloses a common waste receptacle design.

U.S. Pat. No. 6,328,320 discloses a waste container for the storage and collection of commercial waste having a receptacle including a bottom wall and a peripheral side wall extending upwardly from the bottom wall and terminating in an upper edge to define a waste compartment with an open top. At least one cover is pivotally mounted to an upper portion of the receptacle and is moveable between an open position, in which the cover is remote of the open top to permit access to the waste receptacle, and a closed position, in which the cover at least partially overlies the open top. In a preferred embodiment of the invention, a handle extends from the upper portion of the receptacle. A wheel assembly is mounted to a lower portion of the receptacle and includes an elongated axle, wheels rotatably mounted on the axle, and wheel retainers mounted to end portions of the elongated body outwardly of the wheels to retain the wheels on the axle.

It is also a common practice in the art to store waste bags in the bottom portion of the waste receptacle. This practice saves time for the waste collector in not having to move to a storage cabinet or different area to procure new bags for replacement into the waste receptacle. Concerns arise with practice because the replacement bags often stick to the removed bag or collect liquids and other unwanted materials that occasionally overflow from the waste bag in place. Further, this practice of storing replacement bags is commonly known and invites pilferage of small numbers of bags.

Prior art bag collection requires a vertical removal of the full bag from the waste receptacle. This vertical removal requires certain strength and agility as more often than not the full waste bag tends to stick or compress against the sides of the waste receptacle. The necessary pulling and manipulating of the full waste bag may cause undue stress to the waste collector when this action is conducted overtime.

A need for a low cost collection system which will maintain its appearance and still provide adequate waste collection space is needed. An improved collection system with centralized full storage of multiple replacement bags is also a need in the industry as well as a system where removal of the filled bags is conducted in a lateral fashion not a vertical fashion.

SUMMARY OF THE INVENTION

The collection rack of the present invention has been developed to meet the need for a low cost, ergonomically sound collection rack which is light weight and easy to maneuver.

Accordingly, it is an object of the present invention to provide a collection rack using spring steel tension or tension force to hold the waste bag in position.

Another object of the present invention is to provide collection rack that is designed to provide a clean, like new appearance in contrast to common plastic receptacles.

A further object of the present invention is to provide a collection system that is lightweight and easily maneuverable.

It is a still further object of the present invention to provide a collection system wherein the waste bag is stored below the operationally useable bag area and the bag is removable in a lateral direction instead of a vertical direction.

It is yet another object of the present invention to provide a collection system capable of adequately storing two waste container coreless rolls.

A more specific object of the present invention is to provide a collection rack comprising a base having a first side and a second side and an integrated waste container dispenser located thereon, a first upright arm extending out from said first side of said base, a second arm extending out from the second side of the base wherein a waste container is attached across the first and second upright arms.

Another more specific object of the present invention is to provide collection rack wherein the base is manufactured from rolled metal and includes an integrated waste container dispenser comprised of at least one formed recess in the base.

Still another more specific object of the present invention is to provide collection rack wherein the base is manufactured from rolled metal and the integrated waste container dispenser comprises at least two formed recesses in the base.

Yet another more specific object of the present invention is to provide collection rack wherein the base is manufactured from rolled metal, the base further includes a front side and a back side and the integrated waste container dispenser comprises at least one connector extending from the front side of the base to the back side of the base and a formed recess in the connector comprises a integrated waste container dispenser.

Another more specific object of the present invention is to provide collection rack including at least two integrated waste container dispenser located on the base.

Yet still another more specific object of the present invention is to provide collection rack wherein the waste container is attached across the first and second upright arms by a tension force created by the first and second upright arms.

The above objects and other objects, features and advantages of the present invention are readily apparent from the following detailed description of the best mode for carrying out the invention to be taken in connection with the accompanying drawings.

DESCRIPTION OF THE INVENTION

Figure 1:
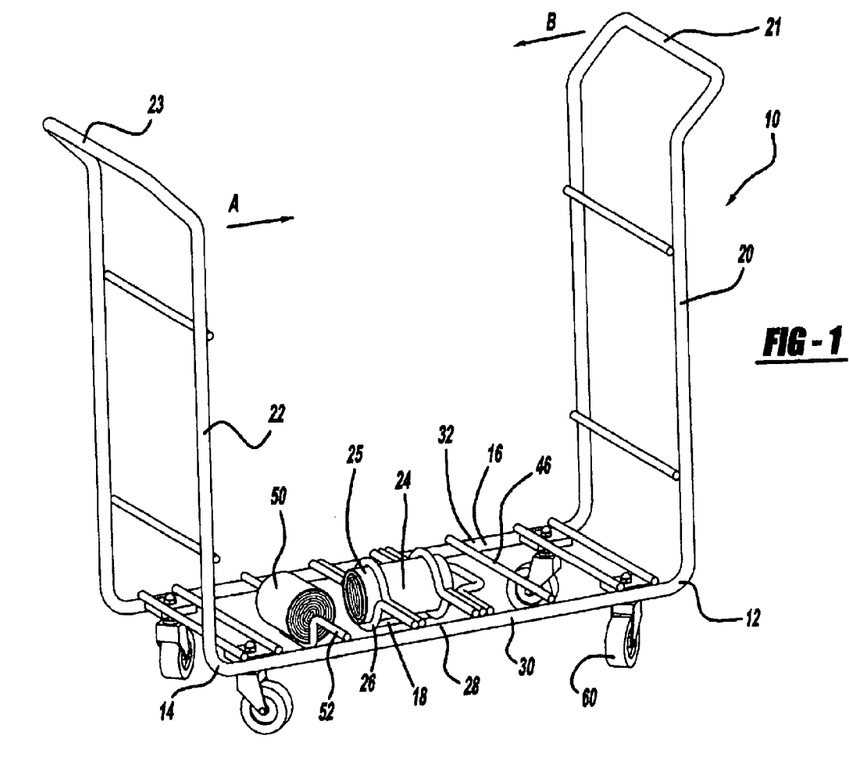
FIG. 1 is a perspective view of the collection rack of the present invention.

Referring now to FIG. 1, there is shown a collection rack 10 having a base 12. Base 12 includes a first side 14 and a second side 16. There is provided an integrated waste container dispenser 18 located on the base 12. A first upright arm 20 extends out from the first side 12 of the base. A second upright arm 22 extends out from the second side 14 of the base. The integrated waste container dispenser 18 is disposed between said first and second upright arms. A coreless roll 24 of waste bags or waste containers 25 is operatively disposed in FIG. 1.

Figures 3, 4:
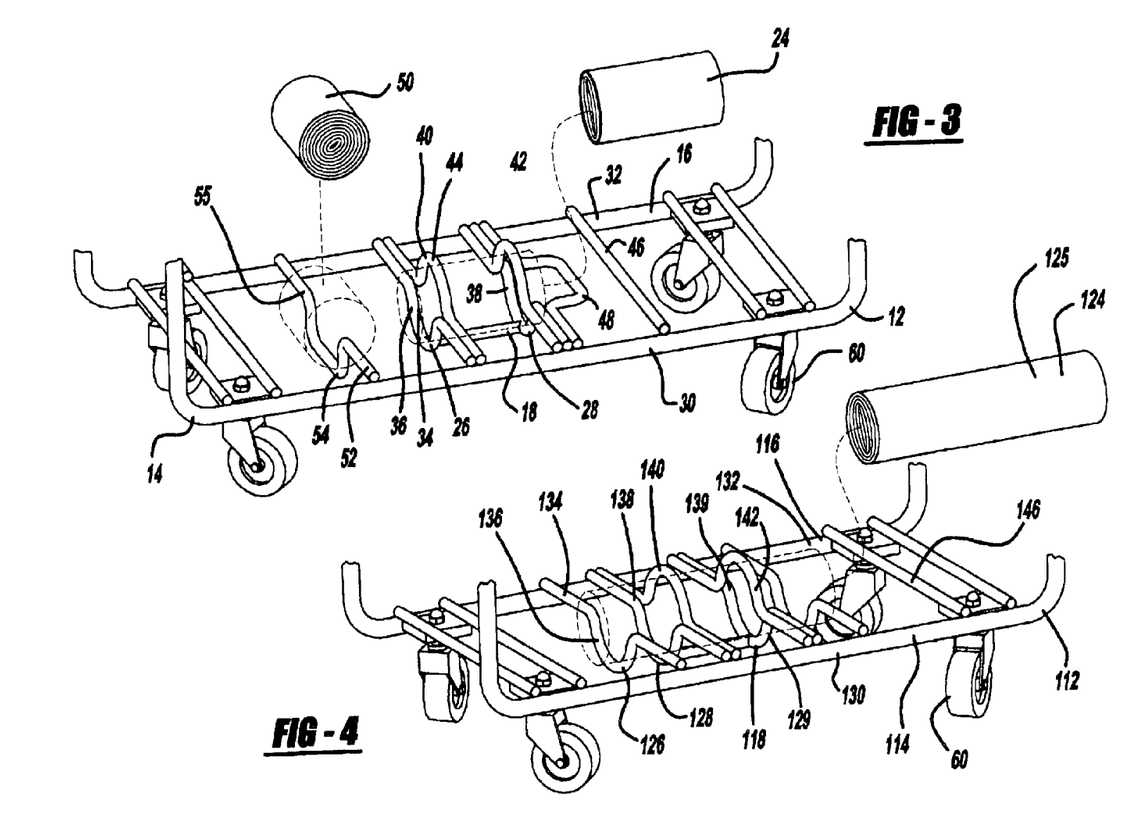
FIG. 3 is a partial exploded view of the collection rack of the present invention, illustrating the insertion of the coreless waste bag rolls.
FIG. 4 is a partial exploded view the alternative embodiment of the collection rack of the present invention, illustrating the insertion of the coreless waste bag roll.

As shown in more detail in FIG. 3, the integrated waste container dispenser 18 is comprised of a formed recess 26 in the base 12. As shown, the integrated waste container dispenser 18 includes an additional recess 28. More specifically base 12 includes a front side 30 and a back side 32. A connector 34 extends from front side 30 to back side 32. Formed recess 26 is a semicircular curve 36 made in the connector 34. Still referring to FIG. 3, there is shown an additional connector 38 extending from the front side 30 of base 12 to back side 32.

Additional top connectors 40 and 42 are also shown connecting front side 30 of base 12 to back side 32. These top connectors also have a semicircular curve 44. FIG. 3 also includes base bars 46 which extend across the front side 30 to the back side 32. A shoulder bar 48 is also included and connects side 30 to side 32.

FIG. 3 also shows an additional coreless roll 50 located on the base 12. Coreless roll 50 is accepted by integrated waste container dispenser 52. Integrated waste container dispenser 52 in comprised of a formed recess 54 in the base 12. A connector 55 extends from front side 30 to back side 32. Formed recess 54 is a semicircular curve 56 made in the connector 55.

FIG. 1 illustrates the coreless rolls 24 and 50 operatively located within the base 12 of the collection rack 10. FIG. 3 illustrates the coreless rolls 24 and 50 in an exploded view such that the inebriated waste container dispensers 18 and 52 are viewable. The coreless rolls 24 and 50 are also shown in phantom in the operative state.

Figure 2:
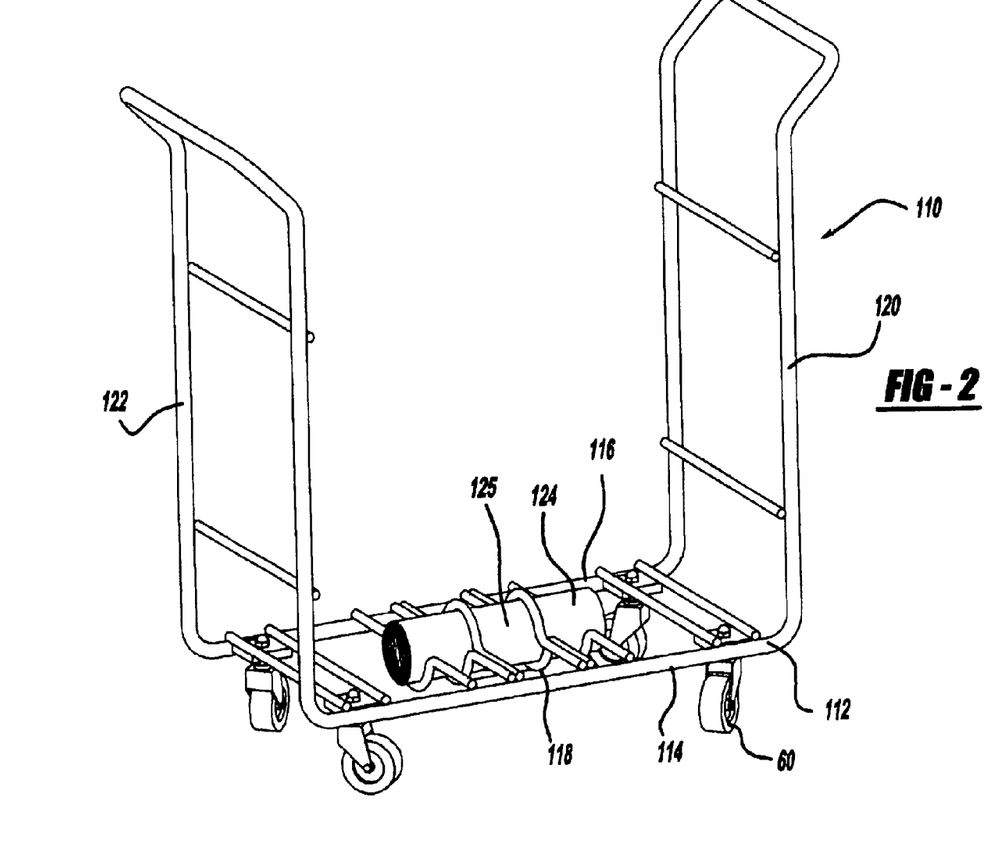
FIG. 2 is a perspective view of an alternative embodiment of the collection rack of the present invention.

Referring now to FIG. 2, there is shown an alternative embodiment of the present invention, a collection rack 110 having a base 112. Base 112 includes a first side 114 and a second side 116. There is provided an integrated waste container dispenser 118 located on the base 112. A first upright arm 120 extends out from the first side 112 of the base. A second upright arm 122 extends out from the second side 114 of the base. The integrated waste container dispenser 118 is disposed between said first and second upright arms. A coreless roll 124 of waste bags or waste containers 125 is operatively disposed in FIG. 2.

As shown in more detail in FIG. 4, the integrated waste container dispenser 118 is comprised of a formed recess 126 in the base 112. As shown, the integrated waste container dispenser 118 includes an multiple additional recesses 128 and 129. More specifically base 112 includes a front side 130 and a back side 132. A connector 134 extends from front side 130 to back side 132. Formed recess 126 is a semicircular curve 136 made in the connector 134. Still referring to FIG. 4, there are shown an additional connector3 138 and 139 extending from the front side 130 of base 112 to back side 132.

Additional top connectors 140 and 142 are also shown connecting front side 130 of base 112 to back side 132. These top connectors also have a semicircular curve 144. FIG. 4 also includes base bars 146 which extend across the front side 130 to the back side 132.

FIG. 2 illustrates the coreless roll 124 operatively located within the base 112 of the collection rack 110. FIG. 4 illustrates the coreless roll 124 in an exploded view such that the integrated waste container dispensers 118 is viewable. The coreless roll 124 is also shown in phantom in the operative state.

Figure 6:
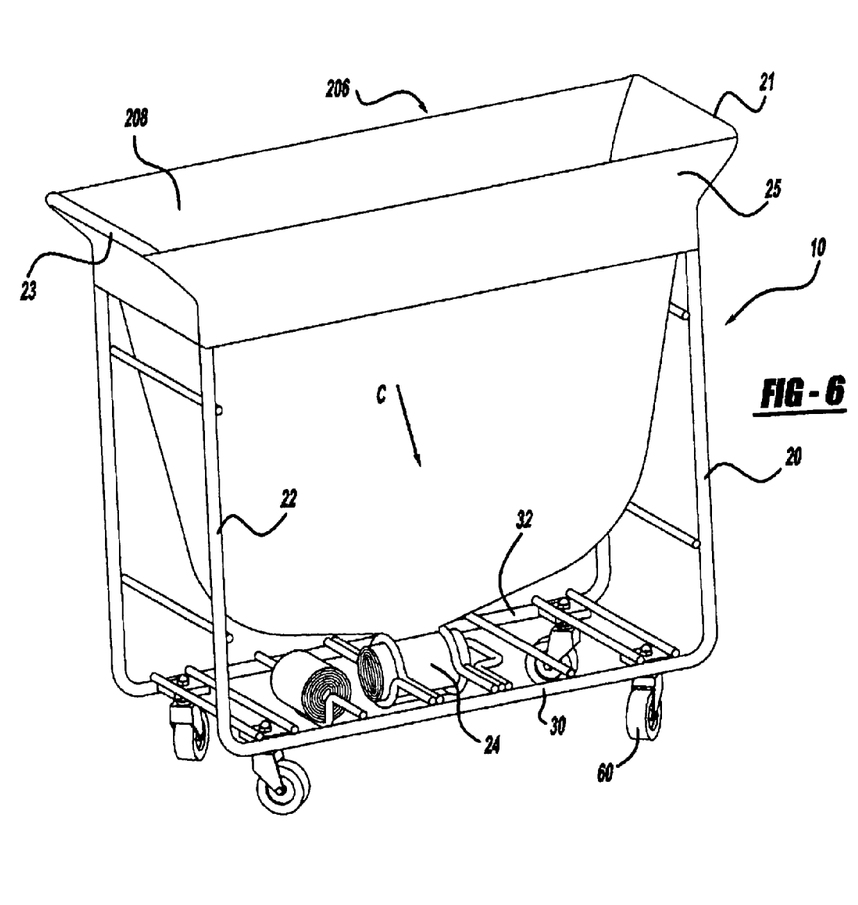
FIG. 6 is a perspective view of the collection rack of the present invention illustrating a waste bag operatively positioned on the collection rack.

Referring know to FIG. 6, there is illustrated, a waste container 25 attached across the first upright arm 20 and second upright second upright arm 22. The waste container 25 is attached across the upright arms 20 and 22 at the top portions 21 and 23 respectively. The waste container 25 is affixed to the uprights arms 20 and 22 by a tension force created by the upright arms 20 and 22. This tension force is created by pulling the upright arms 20 and 22 inward toward each other.

Referring to FIG. 1, the upright arms are shown in a static state. To retain the waste container 25 on the base, the upright arm 20 is pulled in the general direction of the arrow A and upright arm 22 is pulled in the direction of arrow B. The result is shown in FIG. 6 with the waste container 25 stretched across the base 12 allowing provision of waste into the waste container 25. A tension force in a range from 12 to 15 pounds is necessary to hold waste container 25 on said base. It should be noted that the inter relation of the size of the bag opening in contract to the location of the upright arms creates different tension forces. The noted range is for the preferred embodiment using a bag size of 32 gallons with a bag opening diameter of 15 inches. Different bag sizes and different upright arm locations are contemplated by the present invention.

Figure 5:
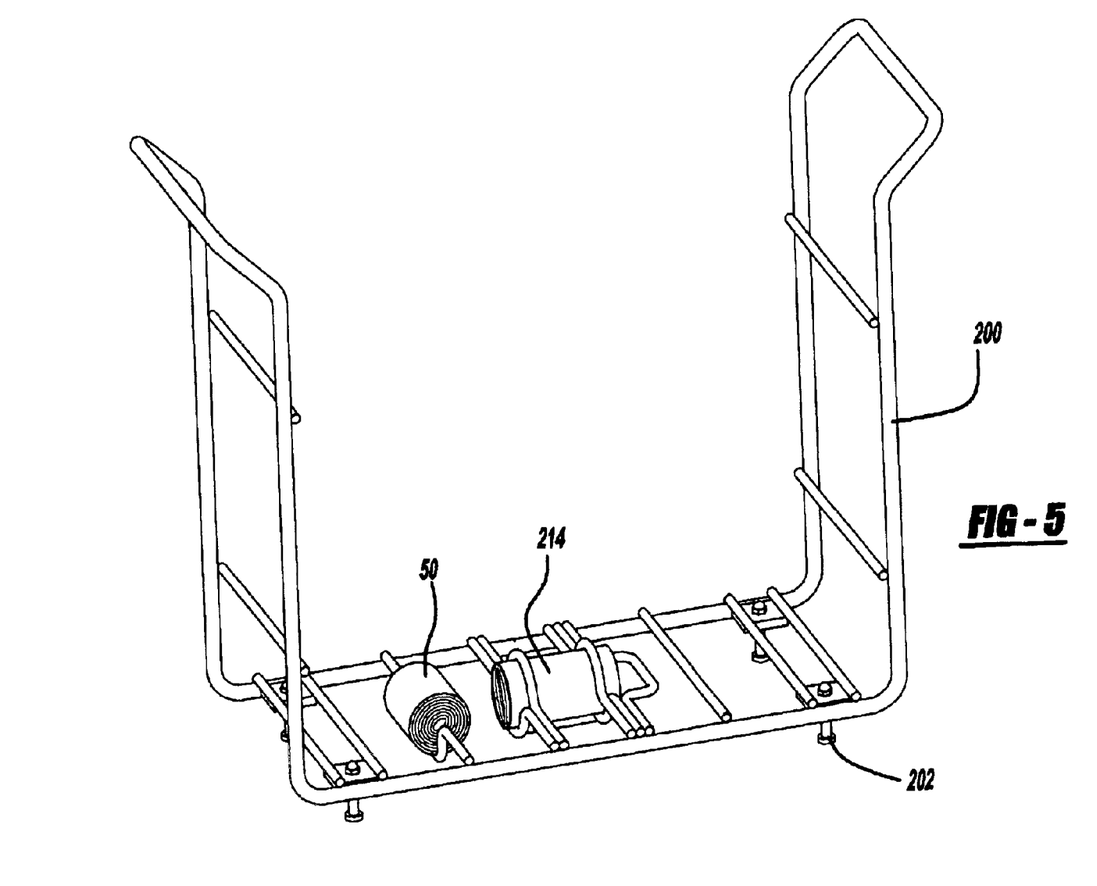
FIG. 5 is a perspective view of yet another alternative embodiment of the collection rack of the present invention.

The collection rack 10 is manufactured from a cold rolled steel. The present contemplates that the collection rack is manufacturable from spring steel, stainless steel, structural foam, aluminum or any metallic material. Certain polymers and plastics may also be used. As shown in FIGS. 1–4 and 6, the collection rack includes rolling wheels or casters 60 attached to the base 12. This allows for free movement of the collection rack. Referring to FIG. 5, there is shown an alternative embodiment of the present invention, a collection rack 200 having bolt on stationary feet 202.

Figure 7:
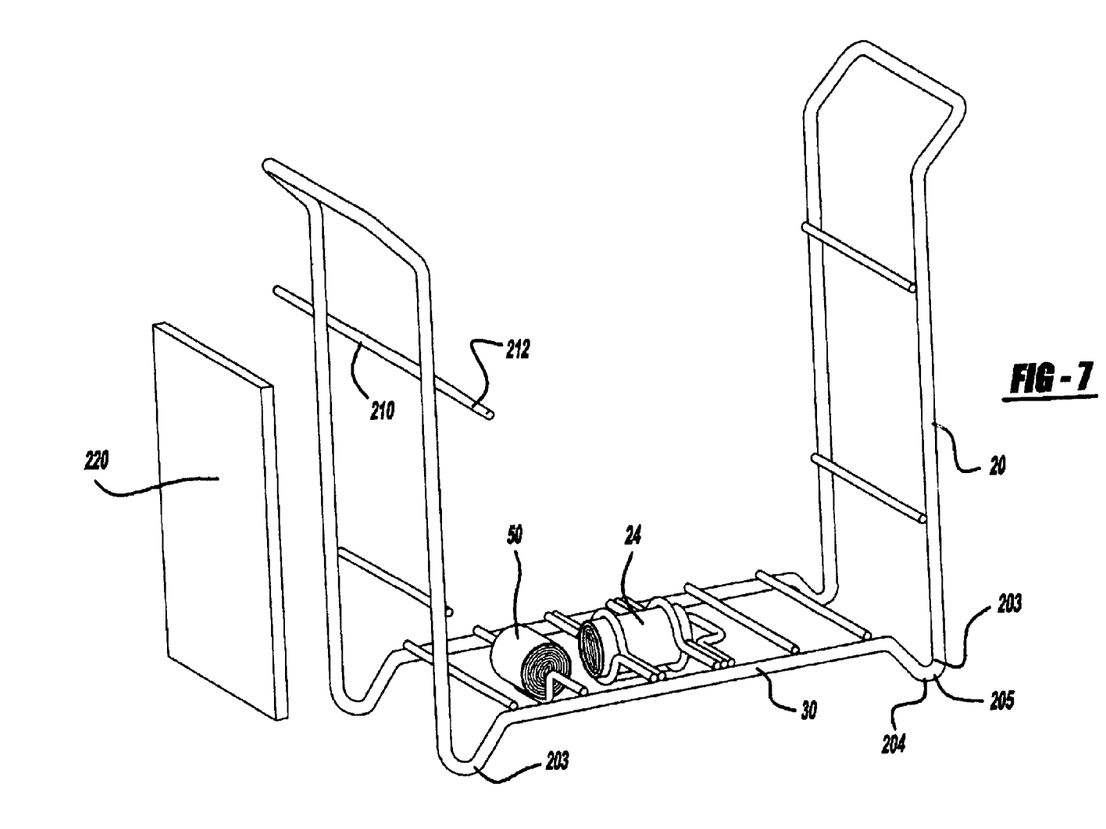
FIG. 7 is a perspective view of yet another alternative embodiment of the collection rack of the present invention.

As shown in FIG. 7, this is yet another alternative embodiment of the present invention illustrating the stationary feet 203 as extensions of the uprights 20. This design does not use the bolt on stationary feet 202 as shown in FIG. 5. The stationary feet 203 are fashioned with a curve 204 which creates a foot 205. In addition, the alternative embodiment of FIG. 7 illustrates a cross bar 210 having an end 212 which extends approximately one inch beyond the upright 22 on either side. This cross bar 210 is fashioned to accept a lid 220. Lid 220 is manufactured to fit across the uprights.

In its operative state, the collection rack 10 provides a collection rack system 204, as shown in FIG. 6. The collection rack system 204 uses the collection rack 10 as described above, in conjunction with a waste container 25. The waste container is a high density, high molecular weight waste bag 208. The present invention contemplates the use of various types of waste containers such a linear low density polyether bags (not shown).

The present collection rack system provides a lightweight container rack which is very cost effective and easy to keep clean and sanitary. The steel construction, as opposed to the prior art is very easy to maintain. In addition, the location of the coreless rolls, centrally within the base prevents unnecessary tip overs and spills of the collection rack. The center of gravity of the collection rack system in use is greatly improved over any form of system that places the bags of the side of the collection receptacle.

Importantly, with the collection rack system, the waste containers are removed laterally away from the base as shown by the arrow C in FIG. 6. This is allowed due to the design of the system.

While the best mode for carrying out the invention has been described in detail, those familiar with the art to which this invention relates will recognize various alternative designs and embodiments for practicing the invention as defined by the following claims.

What is claimed is:

1. A collection rack comprising:
   a base having a first side end a second side and an integrated waste container dispenser located thereon;
   a first upright arm extending out from said first side of said base; and
   a second upright arm extending out from said second side of said base wherein said integrated waste container is disposed between said first and second upright arms and said base is manufactured from rolled metal, said base further includes a front side and a back side and said integrated waster container dispenser comprises at least one connector extending from said front side of said base to said back side of said base and a formed recess in said connector.

2. The collection rack of claim 1 further including a second connector extending from said front side of said base to said back side of said base, located above said connector, said second connector including a formed recess thereby comprising said integrated waste container dispenser.

3. A collection rack system comprising:
   a base having a first side and a second side and an integrated waste container dispenser located thereon;
   a first upright arm extending out from said first side of said base;
   a second upright arm extending out from said second side of said base; and
   a waste container affixable across said first and second upright arms wherein said base is manufactured from rolled metal, said base further includes a front side and a back side and said integrated waster container dispenser comprises at least one connector extending from said from side of said base to said back side of said base and a formed recess in said connector.

4. The collection rack of claim 3 further including a second connector extending from said front side of said base to said back side of said base, located above said connector, said second connector including a formed recess thereby comprising said integrated waste container dispenser.

* * * * *

UNITED STATES PATENT AND TRADEMARK OFFICE
CERTIFICATE OF CORRECTION

PATENT NO. : 6,820,843 B2
DATED : November 23, 2004
INVENTOR(S) : Robert Sibley

It is certified that error appears in the above-identified patent and that said Letters Patent is hereby corrected as shown below:

Column 4,
Line 3, "connector3" should be -- connector --.

Column 5,
Line 23, "end" should be -- and --.

Signed and Sealed this

Twenty-fourth Day of May, 2005

JON W. DUDAS
*Director of the United States Patent and Trademark Office*